Patented Aug. 3, 1954

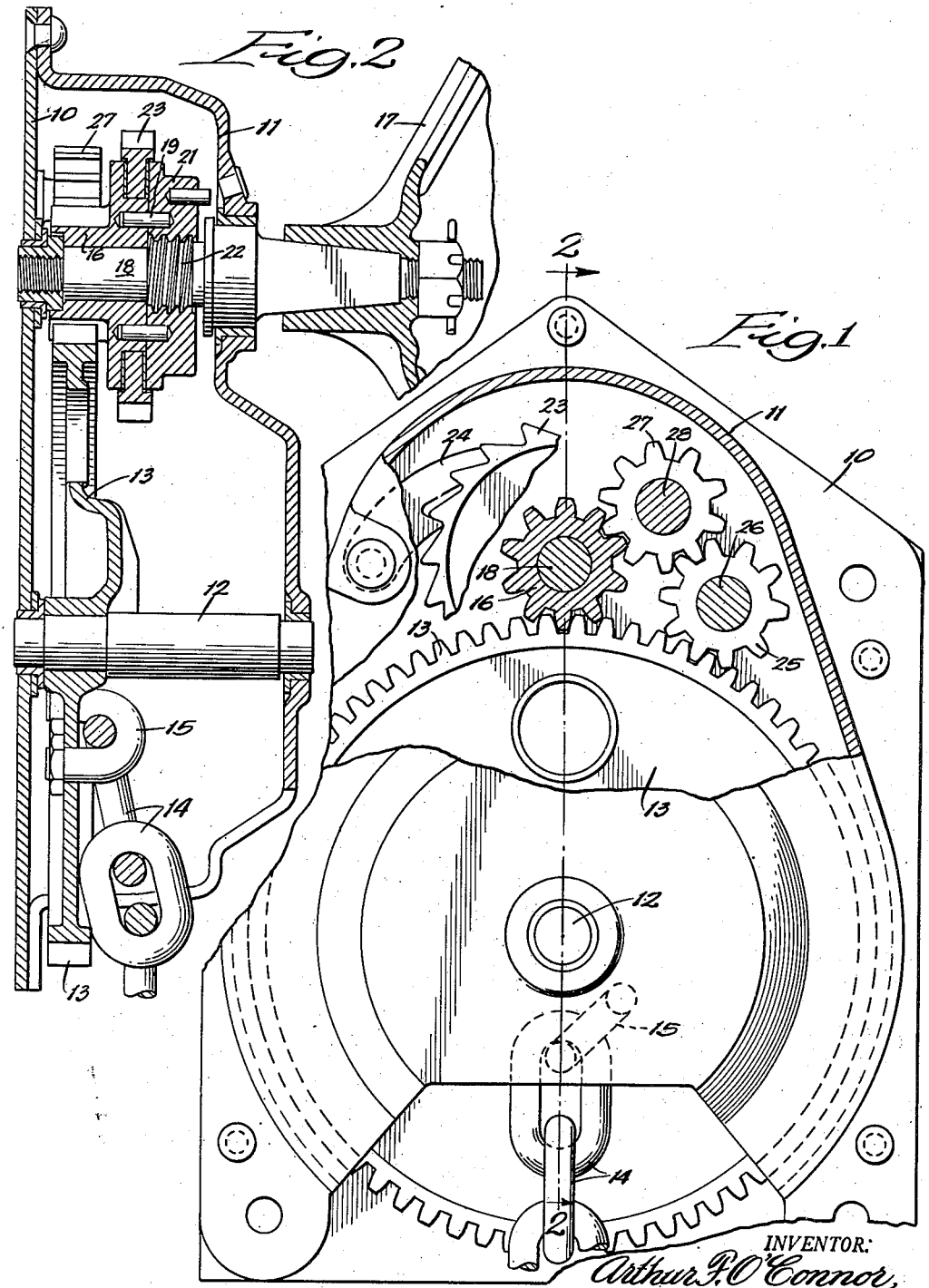

2,685,213

UNITED STATES PATENT OFFICE 2,685,213

RAILWAY HAND BRAKE MECHANISM

Arthur F. O'Connor, Chicago, Ill., assignor to Union Asbestos & Rubber Company, Chicago, Ill., a corporation of Illinois Application October 10, 1952, Serial No. 314,052

2 Claims. (Cl. 74—505)

This invention relates to railway hand brake mechanisms and more particularly to the construction of the gearing as commonly employed in hand brake mechanisms to improve the performance and safety thereof.

Hand brake mechanisms as commonly used on freight cars and the like normally include a drum carrying a chain or cable connected to the brake to engage it. A driven gear is connected to the drum to turn it and is driven through a small driving pinion which is turned through operating mechanism such as a hand wheel or lever. All conventional brake mechanism currently in use, whether of the vertical hand wheel type, the lever type, or the drop type, employ such constructions.

The provision of a reliable hand brake on a railway car is an important safety feature. The ability of the brake to retard or stop the car contributes materially to the safety of the operator, the prevention of damage to the car or its contents and elimination of injury or damage to other personnel and property. Heretofore serious accidents have occurred due to cars getting out of control because of failure of the hand brakes, which failure has resulted from a missing tooth in either the driving pinion or the driven gear of the hand brake mechanism.

It is one of the principal objects of the present invention to eliminate or minimize the possibility of hand brake failure due to a missing gear tooth.

A further object is to provide a railway hand brake mechanism including an extremely simple and inexpensive arrangement for insuring proper and safe operation of the hand brake even in the event a gear tooth may be missing.

According to one feature of the invention presently existing brake mechanisms can easily be converted to embody the principles of the invention without requiring expensive rebuilding.

A still further object is to provide a railway hand brake mechanism in which failure of the mechanism due to a missing tooth is eliminated by the addition of two simple and inexpensive pinions.

The above and other objects and features of the invention will be more readily apparent when viewed in connection with the accompanying drawings, in which:

Figure 1 is a front elevation of a brake mechanism embodying the invention with parts in section; and Figure 2 is a central vertical section on the line 2—2 of Figure 1.

The invention is illustrated herein in connection with a vertical hand wheel type of brake mechanism although it will be understod that the several advantages and features of the invention are equally applicable to any other conventional type of brake mechanism such as a lever type or drop type. The vertical wheel type illustrated comprises a housing including a backing plate 10 to be secured on a railway car and a dished cover 11 fitting over and secured to the backing plate to provide an enclosed space for the gearing mechanism. The housing encloses and rotatably supports a drum shown as a relatively enlarged shaft or spindle 12 journaled at its opposite ends in the backing plate and the cover and rigidly carrying a main driven gear 13. A tension device such as a chain 14 for operating the brake extends through the open bottom of the housing for connection to the brake rigging and is anchored to the gear by means of a U-bolt 15. As the gear is turned the chain will be wrapped around the spindle 12 to apply the brake.

The driven gear and drum are turned by means of a relatively small driving pinion 16 which meshes with the driven gear 13 and which may be turned by any desired type of operating means such as the hand wheel partially shown at 17. The mechanism illustrated in the present application is similar to that more particularly described and claimed in my copending application Serial No. 212,306, filed February 23, 1951, although it will be understood that this mechanism is selected as typical of brake mechanisms of the type heretofore known to which the present invention may be applied.

In the construction shown, the hand wheel 17 is connected to a shaft 18 which is journaled in the backing plate 10 and the cover 11 for free rotation. The pinion 16 is freely rotatable on the shaft and is connected through pins 19 to a pressure plate 21 which is threaded on a threaded portion 22 of the shaft. The pins 19 connect the pressure plate and driving pinion against relative rotation in all relative axial positions thereof, while permitting free axial movement therebetween.

A ratchet wheel 23 is mounted between the pinion 16 and the pressure plate 21 and is held against rotation in one direction by a pivoted pawl 24.

When the hand wheel is turned clockwise as seen in Figure 1 the pawl 24 will overrun the ratchet wheel and the threads 22 will cause the pressure plate 21 to move toward the pinion 16 so that the pinion will be turned clockwise with the hand wheel. When the hand wheel is released the pawl will hold the ratchet against counterclockwise rotation and the ratchet will be frictionally gripped between the pressure plate and the pinion to hold the pinion and the main driven gear against reverse rotation. To release the brake the hand wheel is turned counterclockwise, thereby backing the pressure plate away from the ratchet and allowing the pinion to turn counterclockwise relative to the ratchet. It will be noted that as soon as the hand wheel is released the ratchet will again be frictionally gripped between the pinion and the pressure plate to eliminate free spinning of the hand wheel with the possible undesired loss of chain tension and damage to the operator.

With a construction as so far described the mechanism will function properly under all conditions except when a tooth is missing from the driven gear or the pinion. If a tooth is missing, a dead spot in the operation of the brake will result to prevent proper application of the brake and possibly to release the brake for free turning to its disengaged position.

To eliminate this possibility, according to the present invention a second drive pinion 25 is provided freely journaled on a stub shaft 26 carried by the backing plate 10 or which may extend between the backing plate and the cover so that the pinion 25 meshes with the gear 13 but is spaced from the driving pinion 16. An idler pinion 27 journaled on a stub shaft 28 carried by the backing plate 10 meshes with the two driving pinions 16 and 25 but is spaced from and out of mesh with the driven gear. Due to the idler pinion the two driving pinions will necessarily turn in the same direction at the same peripheral speed so that under normal conditions the driven gear will be turned by both of the driving pinions.

With this construction, it will be seen that if there should be a missing tooth in the driven gear it cannot register with both of the driving pinions at the same time so that the gear and the drum will always be driven through at least one of the driving pinions. In the event a tooth is missing from the driving pinion it cannot simultaneously register with both the driven gear and the idler pinion so that the driven gear will either be driven directly from the driving pinion or indirectly through the idler and second driving pinion at all times.

A further advantage of the present invention is that existing brake mechanisms can easily be modified to embody the safety features of the invention without requiring complete rebuilding of the mechanisms. For example a conventional vertical brake would include all of the elements shown except the idler pinion 27 and second drive pinion 25. The shafts 26 and 28 can easily be mounted in the existing housing of a conventional brake mechanism and the pinions can be mounted thereon without requiring any substantial change in the existing mechanism.

Practically all of the present geared hand brakes are designed with the smallest pitch-diameter driving pinion consistent with needed strength and the largest pitch-diameter driven gear consistent with space limitations in the brake housing, in order to obtain the maximum power development. Numerous tests have developed that there is direct relation between the gear ratio and the ability of geared hand brakes to remain operative, with a tooth missing; most of the present hand brakes being inoperative if a tooth is missing. If a larger pitch-diameter driving pinion is used in the present brakes, it requires that practically every component part of the brake mechanism and the housing be redesigned, as the attendant change in gear ratio will otherwise result in power development below the mandatory figure set up by the Association of American Railroad's rigid specifications for acceptable hand brakes. Such redesigning of the component parts of a hand brake involves new pattern equipment, dies, jigs and fixtures. In the case of a hand brake using a pressed steel housing, it might require new stamping dies, which are very expensive. To obtain new patterns, dies and fixtures would require a large expenditure in money and time, as well as the re-testing of the brake, in order to obtain certification by the Association of American Railroads, before the revised device could be used by the railroads. Inasmuch as the present invention requires only the addition of two small pinions to present geared brake structures, at a nominal cost, the exceptional utility of the invention in the conversion or rebuilding of existing brakes to provide the safety and reliability desired will be apparent.

While one embodiment of the invention has been shown and described herein, it will be understood that this is illustrative only and not to be taken as a definition of the scope of the invention, reference being had for this purpose to the appended claims.

What is claimed is:

1. A railway hand brake mechanism comprising a relatively large driven gear, means connected to the driven gear to connect it to a brake, a relatively small driving pinion meshing with the driven gear, operating means connected to the driving pinion to turn it, an idler pinion meshing with the driving pinion and spaced from the driven gear, and a second driving pinion meshing with the idler pinion and with the driven gear at a point circumferentially spaced from the first named driving pinion.

2. A railway hand brake mechanism comprising a relatively large driven gear, means connected to the driven gear to connect it to a brake, a driving pinion meshing with the driven gear, ratchet means connected to the driving pinion normally to prevent rotation thereof in one direction, operating means connected to the driving pinion and the ratchet means to control the ratchet means to permit rotation of the driving pinion in said one direction and to turn the driving pinion in the other direction, a second driving pinion meshing with the driven gear and spaced circumferentially from the first named driving pinion, and an idler pinion meshing with both of the driving pinions and spaced from the driven gear.

References Cited in the file of this patent
UNITED STATES PATENTS

| Number | Name | Date |
| --- | --- | --- |
| 1,926,175 | Richards | Sept. 12, 1933 |
| 2,508,186 | Newell | May 16, 1950 |
| 2,586,969 | Marquardt et al. | Feb. 26, 1952 |